July 11, 1950 LE ROY S. DUNHAM 2,514,480
AIR-DEPOLARIZED CELL
Filed June 19, 1946
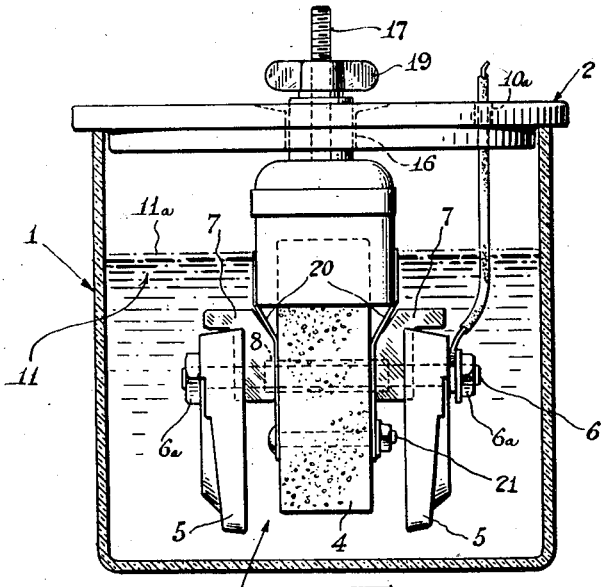
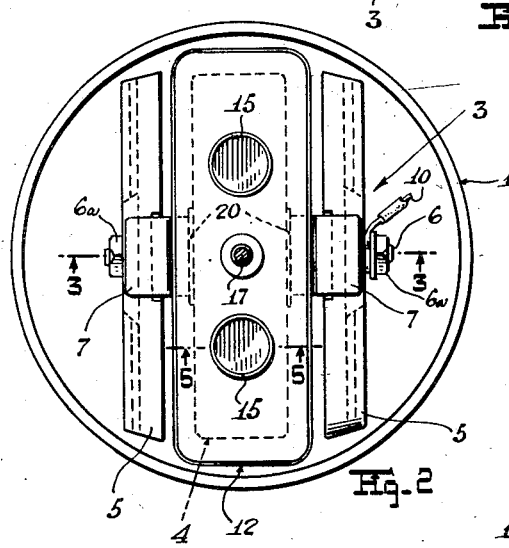
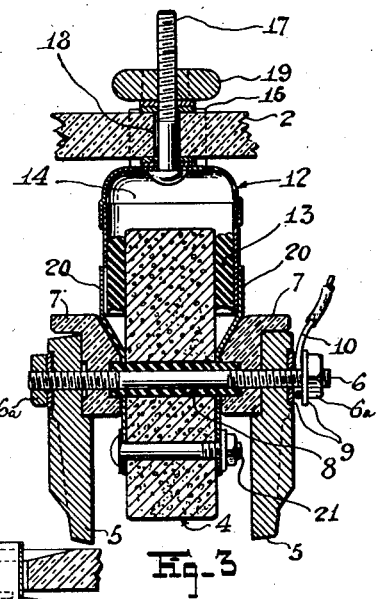
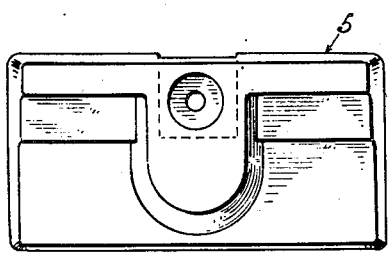
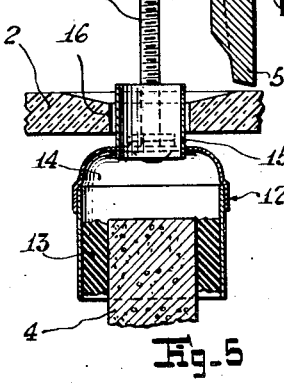
INVENTOR
Le Roy S. Dunham
BY Henry Lanahan
ATTORNEY Patented July 11, 1950

2,514,480

UNITED STATES PATENT OFFICE 2,514,480

AIR-DEPOLARIZED CELL

Le Roy S. Dunham, East Orange, N. J., assignor to Thomas A. Edison, Incorporated, West Orange, N. J., a corporation of New Jersey Application June 19, 1946, Serial No. 677,671

1 Claim. (Cl. 136—136)

This invention relates to primary galvanic cells of the air-depolarized type. This type of cell employs an air-pervious cathode that is depolarized by oxygen of the atmosphere. Typically, such cathodes are made of a porous carbonaceous material and are used in combination with anodes of zinc and with a liquid electrolyte of caustic alkali, but it will be understood that the invention is not limited necessarily to these specific elements.

The present invention comprises a novel form of air-depolarized cell which is adapted to render the cell more dependable, more efficient and more economical. Particularly, it is an object of my invention to provide a novel protective means for the cathode of such cell which is adapted to keep the top part of the cathode free from dirt and to protect it positively against slopping of the electrolyte thereon while yet exposing the cathode amply to the atmosphere.

It is a further object of my invention to lead the current out from the cathode in a way which will retard the electrolyte from penetrating the cathode.

It is another object to provide current connections to the cathode which will minimize the effective electrical resistance of the cathode.

More particularly, it is an object to provide the cathode with a protective metal cap which carries the current from the cathode and which constitutes a support member for the electrode assembly. Moreover, it is an object to provide such protective cap with a post adapted for attachment to the cover of the cell container and which serves as an exterior terminal for the cathode.

These and other objects and features of my invention will be apparent from the following description and the appended claim.

In the description of my invention reference is had to the accompanying drawings, of which:

Figure 1 is a view, partly in elevation and partly in section, of an air-depolarized cell according to my invention;

Figure 2 is a top view of this cell with the cover removed;

Figure 3 is a section through the electrode assembly taken substantially on the line 3—3 of Figure 2;

Figure 4 is a side elevation of one of the anode plates; and

Figure 5 is a detailed section taken on the line 5—5 of Figure 2.

The illustrative embodiment of my invention shown in the accompanying figures may comprise a glass jar 1 provided with a cover 2 made for example of porcelain. Suspended from the cover 2, as is hereinafter explained, is a unitary electrode assembly 3 which comprises an air-pervious cathode 4 and two anodes 5. The cathode 4 may be made of a porous carbonaceous material such as is known in the art for this purpose, and is preferably provided in the form of a solid rectangular block as shown. The anodes 5 may be made of zinc and be provided generally in the form of rectangular plates. These anode plates are supported at the opposite sides of the lower portion of the cathode by a bolt 6 which passes through the anode plates, through insulating spacers 7 interposed between the cathode and the anode plates respectively and centrally through the cathode. On the ends of the bolt are nuts 6a which are tightened thereon to clamp the electrode assembly into a unitary structure. The bolt is electrically insulated from the cathode by an insulating sleeve 8 (Figure 3) and is made of metal so as to electrically connect the anode plates together. Interposed between one of the nuts 6a and the adjacent anode plate is a pair of washers 9, and clamped between these washers is a wire 10 which leads out of the jar through an aperture 10a in the cover. This wire constitutes the negative terminal for the cell.

The anode plates and the lower portion of the cathode are immersed in a liquid electrolyte 11 which may be a solution of caustic soda. To prevent contact of the soda solution with the air, it is ordinarily covered with a layer of oil 11a. The top part of the cathode, which is above the electrolyte level, is exposed to the atmosphere and must be kept clean of dirt and out of contact with the oil 11a and electrolyte 11 so that it is free to absorb the oxygen of the atmosphere and maintain the cathode depolarized during the operation of the cell. Since any appreciable penetration of the electrolyte into the cathode body will render the cathode impervious to the air, the cathodes are made electrolyte-repellent by treating them with a suitable light oil, say kerosene, as is well known in the art. Contact of the oil 11a with the cathode is to be prevented, however, because the cathode would gradually absorb the oil and be in this way also rendered impervious to air.

The required conditions above outlined have heretofore been met by covering the sides of the cathode at the level of the oil layer with a suitable paint or by a sleeve as of rubber, and by sealing the cathode to the cover so as to prevent the oil and electrolyte from slopping onto the top of the exposed surface of the cathode. This construction has not been satisfactory in several respects because it "freezes" the cathode to the cover, to prevent replacement of the electrode assembly, and is otherwise expensive. In still another arrangement the upper portion of the cathode has been sealed to a surrounding insulating sleeve and the upper edge of the sleeve has been held in abutment with, but not sealed to, the bottom face of the cover. In this arrangement, however, the air-exposed surface of the cathode is not protected positively against slopping of the electrolyte and oil thereon as the cell is moved and, like the foregoing arrangement, the top surface of the cathode is left exposed so that it tends readily to collect dirt and to be rendered thereby impervious to air.

In the present invention the cathode is covered by a cap 12, made preferably of metal, which closes off the side and upper surfaces of the top portion thereof. The cap is spaced from the cathode and is sealed liquid-tight thereto by a sealing material 13 such as pitch so as to define an air space 14 therewithin which is in contact with the top face of the cathode. This air space is in communication with the outside atmosphere by way of two upstanding ventilating tubes 15 which are, for example, welded or soldered to the cap. For an ordinary-sized cell these ventilating tubes may typically be about ¾" in diameter. These tubes register with respective openings 16 in the cover 2, and are preferably made long enough to traverse the cover and extend a short distance thereabove as shown in Figure 1. To the center part of the cap there is secured an upstanding post 17 which extends through a central opening 18 of the cover and is secured thereto by a nut 19 so as to hold the electrode assembly suspended from the cover. Secured to the sides of the cap are depending metal straps 20 which are interposed between the spacers 7 and the submerged side walls of the cathode. These straps are clamped tightly against the cathode by the nuts 6a on the bolt 6 and are thus held firmly in electrical contact with the cathode. Additionally, the straps may be secured further to the cathode by a bolt 21 as shown in Figure 3. The current connections to the cathode are made by these straps. The post 17, which is connected to the straps by way of the cap 12, constitutes the exterior positive terminal for the cell.

In this preferred cell construction according to my invention, the top of the cathode is amply exposed to the atmosphere by way of the two ventilating tubes 15 so as to enable efficient depolarization of the cathode. This air-exposed part of the cathode is, however, protected substantially from contact with dirt by the top enclosure afforded by the cap and is protected positively against the electrolyte 11 and oil 11a being slopped thereon by the ventilating tubes because these tubes extend upwardly through the cover. Also, it will be observed that the cap gives the needed protection to keep the oil 11a from contacting the cathode since the oil level is about midway the sides of the cap. Additionally, the seal 13 between the cap and the cathode serves to prevent the electrolyte solution from traveling up to the top surface of the cathode and there crystallizing to produce what is commonly known in the art as "creeping salts."

In this cell construction there is also the structural advantage that the current connections to the cathode are made very positively and that they interpose little electrical resistance in the battery circuit because they have a large area of surface contact with the cathode. Moreover, there are advantages realized because these circuit connections are made to the central portion of the cathode below the electrolyte at the source of the current. For instance, when the circuit connections are so made the flow of current in and on the cathode is towards surfaces of the cathode which are wetted by the electrolyte. As a result, the electrolyte which tends to be carried by the current in and on the cathode, by reason of the phenomenon of electro-endosmosis, proceeds towards normally-wetted surfaces of the cathode as against proceeding towards otherwise dry regions of the cathode which would be the case were the current connections made to the top of the cathode as is normally done. Thus, electro-endosmotic effects are deterred from wetting regions of the cathode which must be kept dry to assure depolarization of the cathode. Additionally, upon so making the current connections to the cathode the effective electrical resistance of the cathode is reduced to nearly a minimum value and the efficiency of the cell is therefore increased. Since air-pervious cathode materials have a substantial coefficient of electrical resistance which tends to increase the internal resistance of the cell and decrease the cell efficiency, this improvement by which the effective electrical resistance is reduced is of marked importance in air-depolarized cells.

While I have herein particularly described my invention in terms of a preferred embodiment, it will be understood that this embodiment is illustrative and not limitative of my invention since the same is subject to changes and modifications without departure from the scope of my invention, which I endeavor to express according to the following claim.

I claim:

In an air-depolarized primary cell including a container, an electrolyte and a cover for said container: the combination of a cathode body of air-depolarizing, carbonaceous material in said container; a metal cap enveloping only an upper portion of said cathode body in spaced relation thereto and mounted insulatedly on said upper portion in liquid-tight relation to the side walls thereof; an electrically-conductive upstanding element on said cap electrically connected only thereto and mechanically connected to said cover for holding said cathode body suspended from the cover in a position wherein the side walls of said cap extend into said electrolyte and the portion of said cathode body depending below said cap is wholly immersed in said electrolyte; means connecting said cap electrically to only a submerged portion of said cathode body, said upstanding element serving as an electrical terminal for said cathode body; and a ventilating tube leading from said cap to the outside atmosphere.

LE ROY S. DUNHAM.

REFERENCES CITED

The following references are of record in the file of this patent:

UNITED STATES PATENTS

| Number | Name | Date |
|---|---|---|
| 2,014,856 | Martus et al. | Sept. 17, 1935 |
| 2,044,923 | Thompson et al. | June 23, 1936 |
| 2,175,885 | Eddy | Oct. 10, 1939 |
| 2,221,106 | Portail | Nov. 12, 1940 |

FOREIGN PATENTS

| Number | Country | Date |
|---|---|---|
| 441,327 | Great Britain | Jan. 9, 1936 |
| 462,450 | Great Britain | Mar. 9, 1937 |
| 212,991 | Germany | Sept. 19, 1907 |
| 712,324 | France | July 20, 1931 |